US008055844B2

(12) United States Patent
Lee et al.

(10) Patent No.: US 8,055,844 B2
(45) Date of Patent: Nov. 8, 2011

(54) MEMORY CARD AND MEMORY STORAGE DEVICE USING THE SAME

(75) Inventors: Won-Seok Lee, Suwon-si (KR); Jong-Keun Ahn, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 372 days.

(21) Appl. No.: 12/314,320

(22) Filed: Dec. 8, 2008

(65) Prior Publication Data

US 2009/0164722 A1    Jun. 25, 2009

(30) Foreign Application Priority Data

Dec. 24, 2007  (KR) .................. 10-2007-0136773

(51) Int. Cl.
G06F 12/00    (2006.01)

(52) U.S. Cl. ...................................... 711/115; 711/170
(58) Field of Classification Search .................. 711/115, 711/170
See application file for complete search history.

(56) References Cited

U.S. PATENT DOCUMENTS

| 2004/0148450 A1* | 7/2004 | Chen et al. ..................... 710/313 |
| 2005/0138288 A1* | 6/2005 | Chou et al. ..................... 711/115 |

FOREIGN PATENT DOCUMENTS

| JP | 7-98619 | 4/1995 |
| KR | 10-2001-0081699 | 8/2001 |
| KR | 10-2004-0009459 | 1/2004 |
| KR | 10-2005-0037674 | 4/2005 |

* cited by examiner

*Primary Examiner* — Jasmine Song
(74) *Attorney, Agent, or Firm* — Harness, Dickey & Pierce, P.L.C.

(57) ABSTRACT

A memory card and a memory storage device using the memory card may be provided. The memory card may include a host connector, a memory controller connected to the host connector and enabled or disabled in response to a capacity expansion signal, a non-volatile memory connected to the memory controller, a memory connector configured to connect to the memory controller and the non-volatile memory, and a capacity expansion switch configured to generate the capacity expansion signal. Accordingly, when the memory cards are connected to increase storage capacity, only a memory controller of one memory card may operate, thereby reducing power consumption.

13 Claims, 6 Drawing Sheets

MEMORY CARD AND MEMORY STORAGE DEVICE USING THE SAME

PRIORITY STATEMENT

This application claims the benefit of Korean Patent Application No. 10-2007-0136773, filed Dec. 24, 2007, the contents of which are hereby incorporated herein by reference in their entirety.

BACKGROUND

1. Field

Example embodiments relate to a memory card and a memory storage device using the same, and more particularly, to a memory card whose storage capacity can be increased, and a memory storage device using the memory card.

2. Description of Related Art

In digital products or digital peripheral devices such as Personal Computers (PCs), Motion Picture Experts Group (MPEG) audio layer-3 (MP3) players, digital cameras and electronic dictionaries, a memory storage device may be frequently used to store and replay data. In general, a memory card may be used as a portable memory storage device, and there are various memory cards such as a memory stick, a Secure Digital (SD) card, a mini SD card and a Multimedia Card (MMC). To receive and store data from a host or to output data stored in the memory cards to the host, the memory cards may include a memory controller and a non-volatile memory packaged together.

A host may be able to manage continuously increasing amounts of data. However, the capacity of a non-volatile memory included in the memory card may be fixed when it is produced, and a user can not increase the capacity. Therefore, the user may have to purchase a high-capacity memory card again, which may be expensive.

SUMMARY

According to example embodiments a memory card may include a host connector; a memory controller connected to the host connector and enabled or disabled in response to a capacity expansion signal, a non-volatile memory connected to the memory controller, a memory connector configured to connect to the memory controller and the non-volatile memory, and a capacity expansion switch configured to generate the capacity expansion signal.

Example embodiments may further include a transfer selector configured to connect the memory controller and the non-volatile memory to the memory connector in response to a connection detection signal, wherein the memory connector may include a connection terminal configured to generate the connection detection signal.

The capacity expansion switch may control the capacity expansion signal to be in at least two states, and the memory controller may be enabled in response to one of the at least two states. The non-volatile memory may include an internal Identification (ID) register having an initial value, and the value may be changed according to the state of the capacity expansion signal. The non-volatile memory may maintain the initial value of the ID register in response to one of the at least two states of the capacity expansion signal, and change the value of the ID register in response to the other of the at least two states of the capacity expansion signal. The host connector and the memory connector may be externally exposed outside of the memory card, and the memory connector may externally output a memory interface signal out of the memory card. The host connector may transfer a host interface signal, the memory connector may transfer the memory interface signal, and the host and memory interface signals may include ID information that is compared with the value of the ID register.

According to the example embodiments, when the memory controller is enabled, it may receive the host interface signal transferred through the host connector and generate the memory interface signal, and the non-volatile memory may receive the memory interface signal transferred from the memory controller or the memory connector, perform an operation when the value of the ID register is the same as the ID information, and not perform the operation when the value of the ID register is not the same as the ID information.

According to the other example embodiments, the memory controller may receive the host interface signal transferred through the host connector and generates the memory interface signal when the memory controller is enabled, and the non-volatile memory may receive the memory interface signal transferred from one of the memory controller and the memory connector, with the non-volatile memory performing an operation when the value of the ID register is the same as the ID information and not performing the operation when the value of the ID register is not the same as the ID information.

According example embodiments, a memory storage device may include first and second memory cards, each of the first and second memory cards including the memory card according to example embodiments, wherein the memory connectors of the first and second memory cards may be connected to each other, and one of the memory controllers of the first and second memory cards is enabled.

The non-volatile memories of the first and second memory cards may each include an internal ID register having an initial value, maintain the initial value in response to a first state of the capacity expansion signal, and change the value of the ID register in response to a second state of the capacity expansion signal. The non-volatile memories of the first and second memory cards may perform an operation when the value of the ID register is the same as ID information, and not perform the operation when the value of the ID register is not the same as the ID information.

According to example embodiments, the memory controller of the first memory card of the memory storage device may be enabled in response to the first state of the capacity expansion signal, receive a host interface signal transferred through the host connector, generate a memory interface signal and transfer the memory interface signal to the non-volatile memory and the memory connector of the first memory card, the memory controller of the second memory card may be disabled in response to the second state of the capacity expansion signal, the second memory card may receive the memory interface signal through the memory connector of the second memory card, and the host interface signal and the memory interface signal may include the ID information that is compared with the value of the ID register.

According to example embodiments, the memory controller of the first memory card of the memory storage device may be enabled in response to the first state of the capacity expansion signal, receive a host interface signal transferred through the host connector, generate a memory interface signal and transfer the memory interface signal to the non-volatile memory and the transfer selector of the first memory card, the memory controller of the second memory card may be disabled in response to the second state of the capacity expansion signal, the second memory card may receive the memory interface signal through the memory connector of the second memory card, and the host interface signal and the memory interface signal may include the ID information that is compared with the value of the ID register.

According to example embodiments, a method of controlling a memory card may include generating a capacity expansion (DES) signal, receiving a host interface (HIFS) signal at a memory controller, converting the HIFS signal into a memory interface (MIFS) signal and outputting the MIFS signal to a non-volatile memory and a memory connector based on the DES signal, selectively receiving the MIFS signal at the non-volatile memory from one of the memory controller and a memory connector based on the DES signal; and reading or writing data at the non-volatile memory based on at least one of the MIFS signal and the DES signal.

Example embodiments may further include connecting the memory controller and the non-volatile memory to the memory connector in response to a connection detection signal.

Other details of the example embodiments are set forth in the following detailed description and the accompanying drawings.

BRIEF DESCRIPTION OF THE DRAWINGS

The above and other features and advantages will become more apparent by describing in detail example embodiments thereof with reference to the attached drawings in which.

DETAILED DESCRIPTION OF THE EMBODIMENTS

Figure 1:
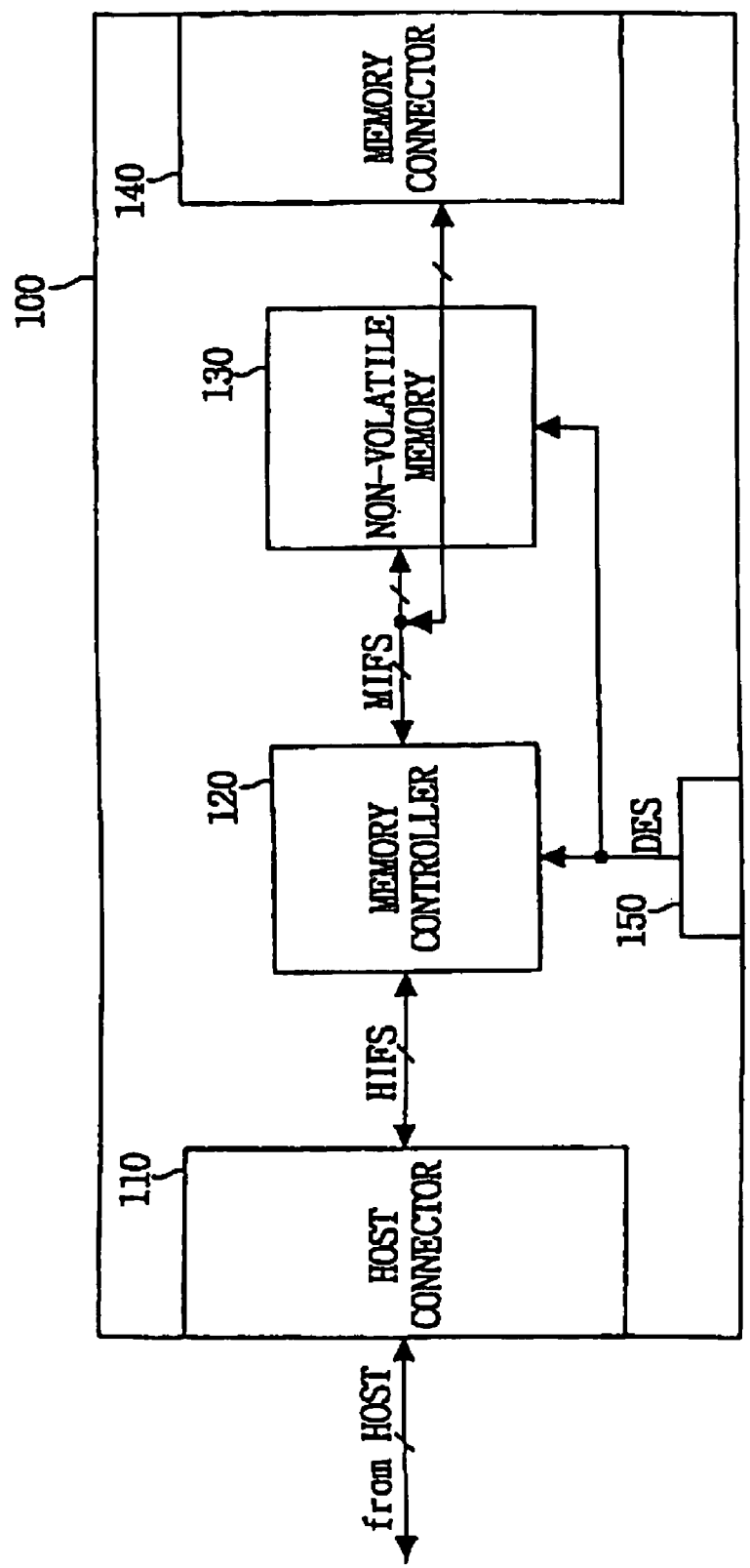
FIG. 1 is a block diagram of a memory card according to example embodiments.

Various example embodiments will now be described more fully with reference to the accompanying drawings in which example embodiments are shown. In the drawings, the thicknesses of layers and regions may be exaggerated for clarity.

Detailed illustrative embodiments are disclosed herein. However, specific structural and functional details disclosed herein are merely representative for purposes of describing example embodiments. Example embodiments may, however, may be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures. The figures are intended to depict example embodiments and should not be interpreted to limit the intended scope of the claims. The accompanying figures are not to be considered as drawn to scale unless explicitly noted.

The terminology used herein is for the purpose of describing particular embodiments only and is not intended to be limiting of example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In this specification, the term "and/or" picks out each individual item as well as all combinations of them.

Terms used in this specification are intended not to limit the example embodiments but to describe example embodiments. Terms written in the singular are to be interpreted as possibly being plural unless stated otherwise. In addition, the terms "comprise" and/or "comprising" do not exclude the existence or addition of at least one component, step and/or device other than those mentioned.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

A portable storage device according to example embodiments will be described in detail below.

Figure 2A:
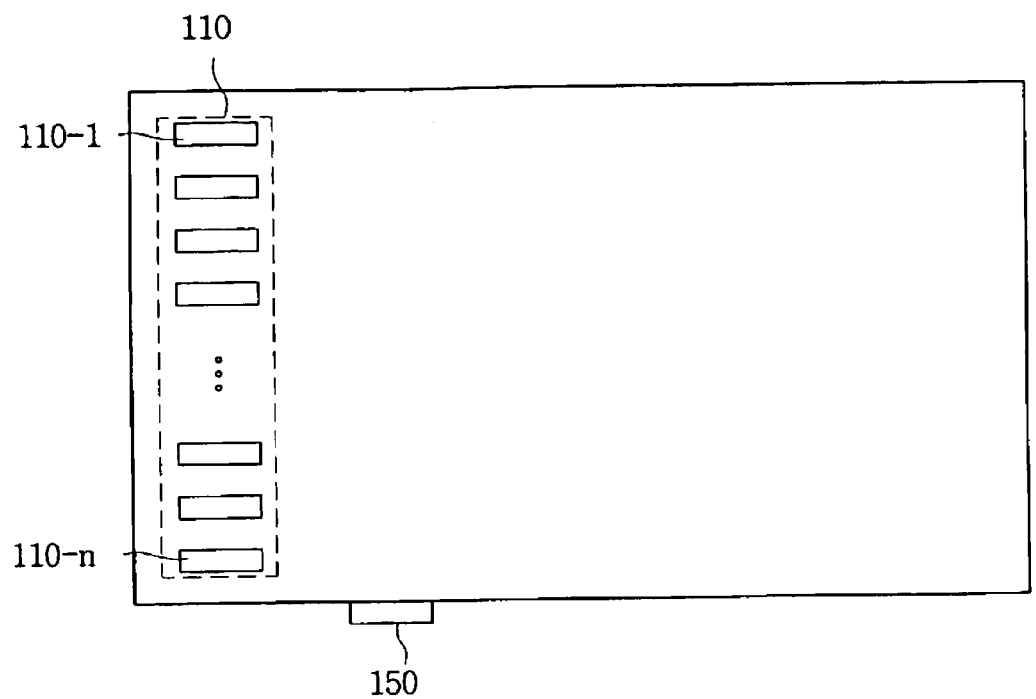
FIGS. 2A and 2B are a front view and a rear view of the memory card of FIG. 1, respectively.
Figure 2B:
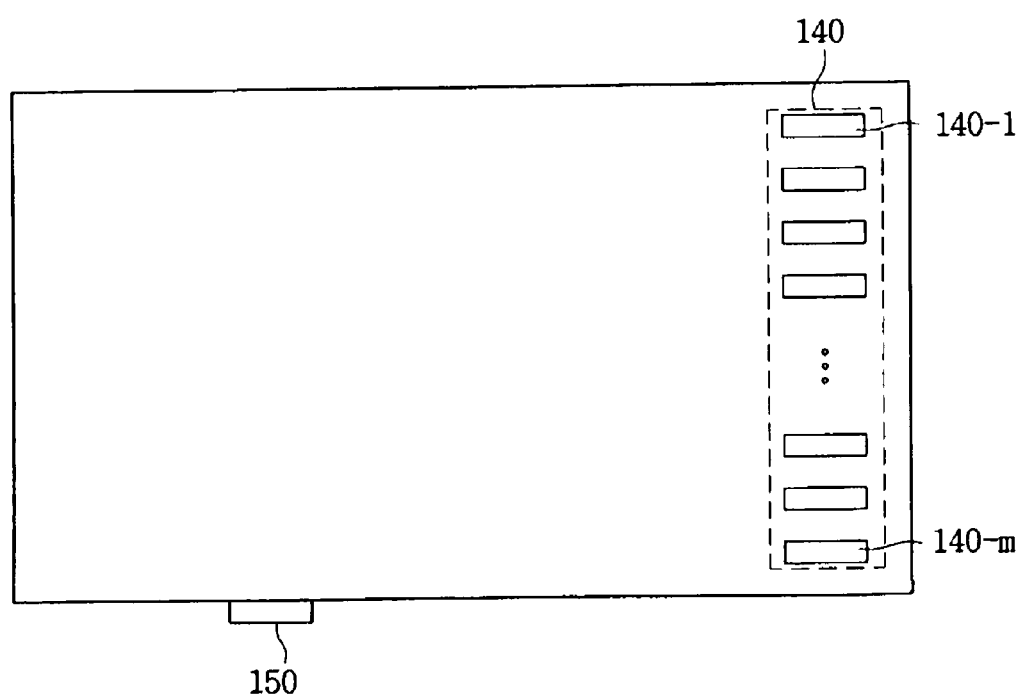

FIG. 1 is a block diagram of a memory card according to example embodiments, and FIGS. 2A and 2B are a front view and a rear view of the memory card of FIG. 1, respectively.

Referring to FIGS. 1, 2A and 2B, a memory card 100 may include a host connector 110, a memory controller 120, a non-volatile memory 130, a memory connector 140, and a capacity expansion switch 150. A memory card may refer to a storage device, in which a non-volatile memory and a memory controller for controlling the non-volatile memory are packaged together, including a means capable of interfacing with a host.

The host connector 110 may include a plurality of Input/Output (I/O) pins 110-1 to 110-n in the front side of the memory card 100, where n may be an integer. The I/O pins 110-1 to 110-n may interface a host interface signal (hereinafter referred to as an HIFS signal) including power, a clock signal, control signals, data, etc., used for operation of the memory card 100, with a host. The number of the I/O pins 110-1 to 110-n may vary according to each memory card. For example, a Secure Digital (SD) card may include one clock pin, three power pins, four data pins, and one command pin.

The memory controller 120 may input or output a HIFS signal through the host connector 110, and receive a capacity-expansion detection signal (DES signal) from the capacity expansion switch 150. The memory controller 120 may be disabled in response to the DES signal of a first state and may not operate. Alternatively, the memory controller 120 may be enabled in response to the DES signal of a second state and may operate. The memory controller 120 may convert the HIFS signal into a memory interface signal (hereinafter referred to as an MIFS signal) and output the MIFS signal to the non-volatile memory 130 and the memory connector 140. For example, operation of the memory controller 120 may be selectively enabled or disabled in response to the DES signal. The MIFS signal may be used for operation of the non-volatile memory 130, and include a control signal, data, etc., used for writing or reading data in/from non-volatile memory cells (not shown). Generally, the control signal may include Identification (ID) information for selecting the corresponding one of a plurality of non-volatile memories.

The non-volatile memory 130 may receive the DES signal from the capacity expansion switch 150 and the MIFS signal from the memory controller 120 or the memory connector 140. The non-volatile memory 130 may have an ID register (not shown) therein, and may maintain or change the value of the ID register in response to the DES signal. For example, when the initial value of the ID register is "0", the non-volatile memory 130 may change the value to "1" in response to the DES signal of the first state and maintain the initial value of the ID register in response to the DES signal of the second state. The non-volatile memory 130 may receive the MIFS signal from the memory connector 140 in response to the DES signal of the first state, and receive the MIFS signal from the memory controller 120 in response to the DES signal of the second state.

The non-volatile memory 130 may compare ID information included in the received MIFS signal with the value of the internal ID register. When the ID information is the same as the value of the ID register, the non-volatile memory 130 may store data in the non-volatile memory cells (not shown), or output data stored in the non-volatile memory cells to the memory controller 120 or the memory connector 140, in response to the MIFS signal transferred from the memory controller 120 or the memory connector 140. On the other hand, when the ID information included in the MIFS signal transferred from the memory controller 120 or the memory connector 140 is different from the value of the internal ID register, the non-volatile memory 130 may ignore the received MIFS signal and may not perform any operation.

The non-volatile memory 130 may include at least one of a flash memory, a phase change memory, a resistive memory, and a magnetic memory.

The memory connector 140 may include a plurality of pins 140-1 to 140-m that input and output the MIFS signal, where m may be an integer. The pins 140-1 to 140-m may include data pins, control signal pins and/or power pins. The pins 140-1 to 140-m may receive the MIFS signal from the memory controller 120 and output it outside of the memory card 100, or may receive the MIFS signal from outside of the memory card 100 and transfer it to at least one the non-volatile memory 130 and the disabled memory controller 120.

The capacity expansion switch 150 may be externally exposed outside of the memory card 100 and manually controlled by a user. The capacity expansion switch 150 may generate the DES signal of the first state in an on-state, and the DES signal of the second state in an off-state.

For example, when the user wants to increase the capacity of a memory storage device, the user may set the capacity expansion switch 150 to the on-state, and the DES signal may be in the first state. Then, operation of the memory controller 120 may be disabled, and a value stored in the ID register in the non-volatile memory 130 may be changed. On the other hand, when the user does not want to increase the capacity of the memory storage device, the user may set the capacity expansion switch 150 to the off-state. Thus, the DES signal may be in the second state, operation of the memory controller 120 may be enabled, and the ID register in the non-volatile memory 130 may maintain an initial value.

Figure 3:
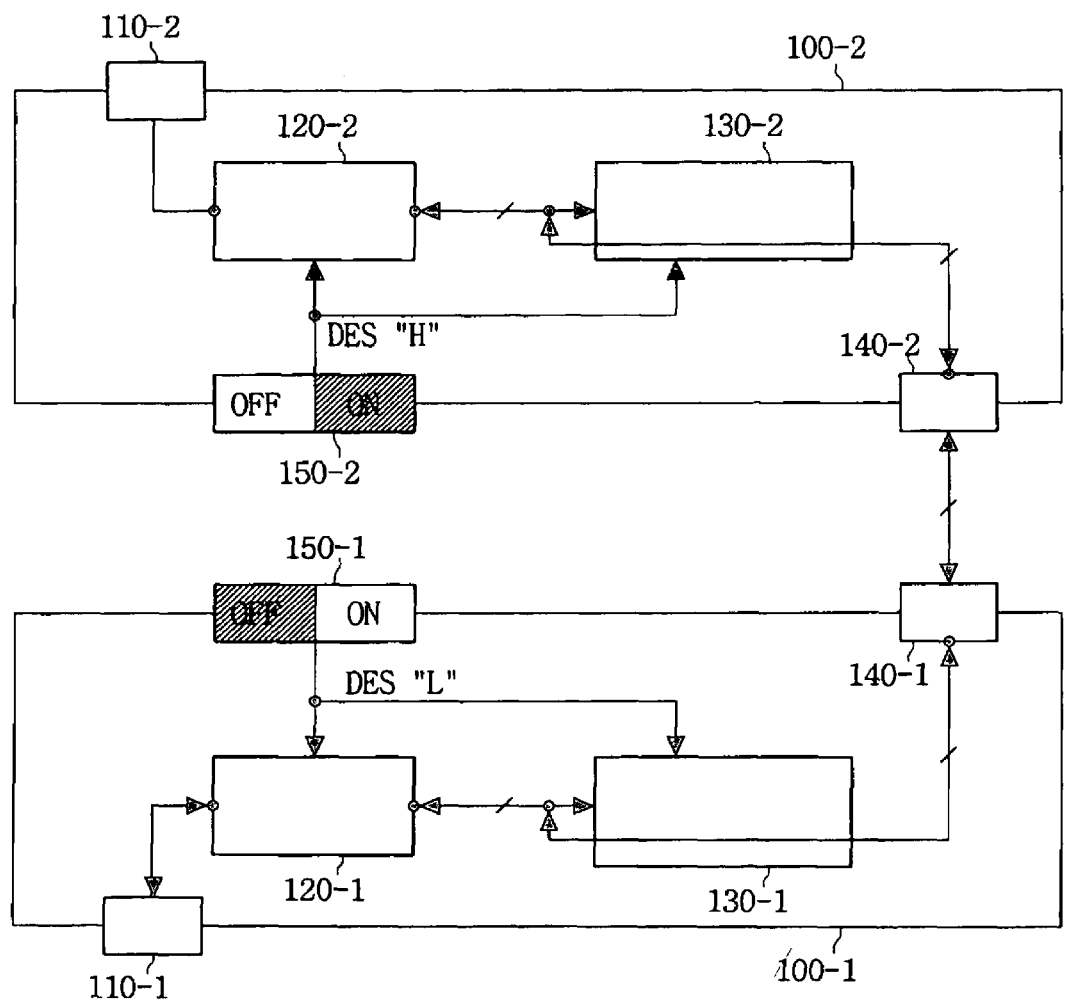
FIG. 3 is a block diagram of a memory storage device having an increased storage capacity by connecting the memory cards of FIG. 1, according to example embodiments.

FIG. 3 is a block diagram of a memory storage device having an increased storage capacity by connecting the memory cards of FIG. 1, according to example embodiments.

As illustrated in FIG. 3, a first memory card 100-1 may be connected with a host (not shown), and a second memory card 100-2 may be connected with the first memory card 100-1 through memory connectors 140-1 and 140-2. In the example embodiments, the memory connectors 140-1 and 140-2 are connected by direct contact with each other, but example embodiments are not limited thereto. For example, the memory connectors 140-1 and 140-2 may be connected through an additional connector interposed between them or a connector of the host.

A capacity expansion switch 150-1 of the first memory card 100-1 may be in the off-state, and a capacity expansion switch 150-2 of the second memory card 100-2 may be in the on-state. Thus, the DES signal of the first memory card 100-1 may become logic low "L", the second state. In response to the DES signal, a memory controller 120-1 may be enabled to operate. In addition, an ID register in a non-volatile memory 130-1 may maintain an initial value.

The DES signal of the second memory card 100-2 may become logic high "H", the first state. In response to the DES signal, a memory controller 120-2 may be disabled, and a value stored in an ID register in a non-volatile memory 130-2 may be changed.

The first memory card 100-1 may be connected with the host (not shown) through a host connector 110-1 and may interface an HIFS signal, and the second memory card 100-2 may be connected with the first memory card 100-1 through the memory connectors 140-1 and 140-2 and may interface an MIFS signal.

Operation of the memory storage device of FIG. 3 will be described in detail below.

First, a user may set the capacity expansion switch 150-1 of the first memory card 100-1, which may be connected with the host, to the off-state, and the capacity expansion switch 150-2 of the second memory card 100-2, which may be connected with the first memory card 100-1, to the on-state. Therefore, the ID register of the non-volatile memory 130-1 of the first memory card 100-1 may maintain an initial value, for example, "0", and the ID register of the non-volatile memory 130-2 of the second memory card 100-2 may change the ID value to, for example, "1", in response to the DES signal of the first state. In addition, the memory controller 120-1 of the first memory card 100-1 may be enabled, and the memory controller 120-2 of the second memory card 100-2 may be disabled.

The host may recognize that two memory cards are used as a storage device. Preferably, the host may sense that two memory cards are installed therein, include ID information in an HIFS signal, and interface the HIFS signal with the two memory cards.

The first memory card 100-1 may receive the HIFS signal from the host through the host connector 110-1. The memory controller 120-1 may convert the received HIFS signal into a MIFS signal and transfer the MIFS signal to the non-volatile memory 130-1 and the memory connector 140-1. The memory connector 140-1 may output the MIFS signal, which may be transferred to the memory connector 140-2 of the second memory card 100-2. The non-volatile memory 130-2 of the second memory card 100-2 may receive the MIFS signal through the memory connector 140-2 instead of through from the memory controller 120-2.

The respective non-volatile memories 130-1 and 130-2 of the memory cards 100-1 and 100-2 may compare an ID included in the received MIFS signal with IDs stored in the ID registers. When the ID included in the received MIFS signal is the same as the stored ID, the corresponding non-volatile memory 130-1 and/or 130-2 may perform a write or read operation in response to the MIFS signal. On the other hand, when the ID included in the received MIFS signal is not the same as the stored ID, the corresponding non-volatile memories 130-1 and/or 130-2 may not perform any operation. Generally, only one of the non-volatile memories 130-1 and 130-2 may have the same ID as the ID included in the received MIFS signal, and thus only one of the non-volatile memories 130-1 and 130-2 may perform an operation at a give time. For example, when the non-volatile memory 130-2 performs the read operation, read data may be output to the outside of the second memory card 100-2 through the memory connector 140-2, input to the first memory card 100-1 through the memory connector 140-1, and transferred to the host through the memory controller 120-1 and the host connector 110-1.

As described above, in a memory storage device having increased storage capacity by connecting two memory cards, only a memory controller in one of the two memory cards may generally operate to perform the write and read operations of respective non-volatile memories. Thus, it may be possible to reduce the power consumed by memory controllers. Meanwhile, while only two memory cards have been described and shown connected, three or more memory cards may be connected to increase storage capacity without departing form the spirit of the example embodiments. In such a case, the capacity expansion switches 150-1 and 150-2 may be configured to have three states, including an additional state as well as the on-state and the off-state.

Figure 4A:
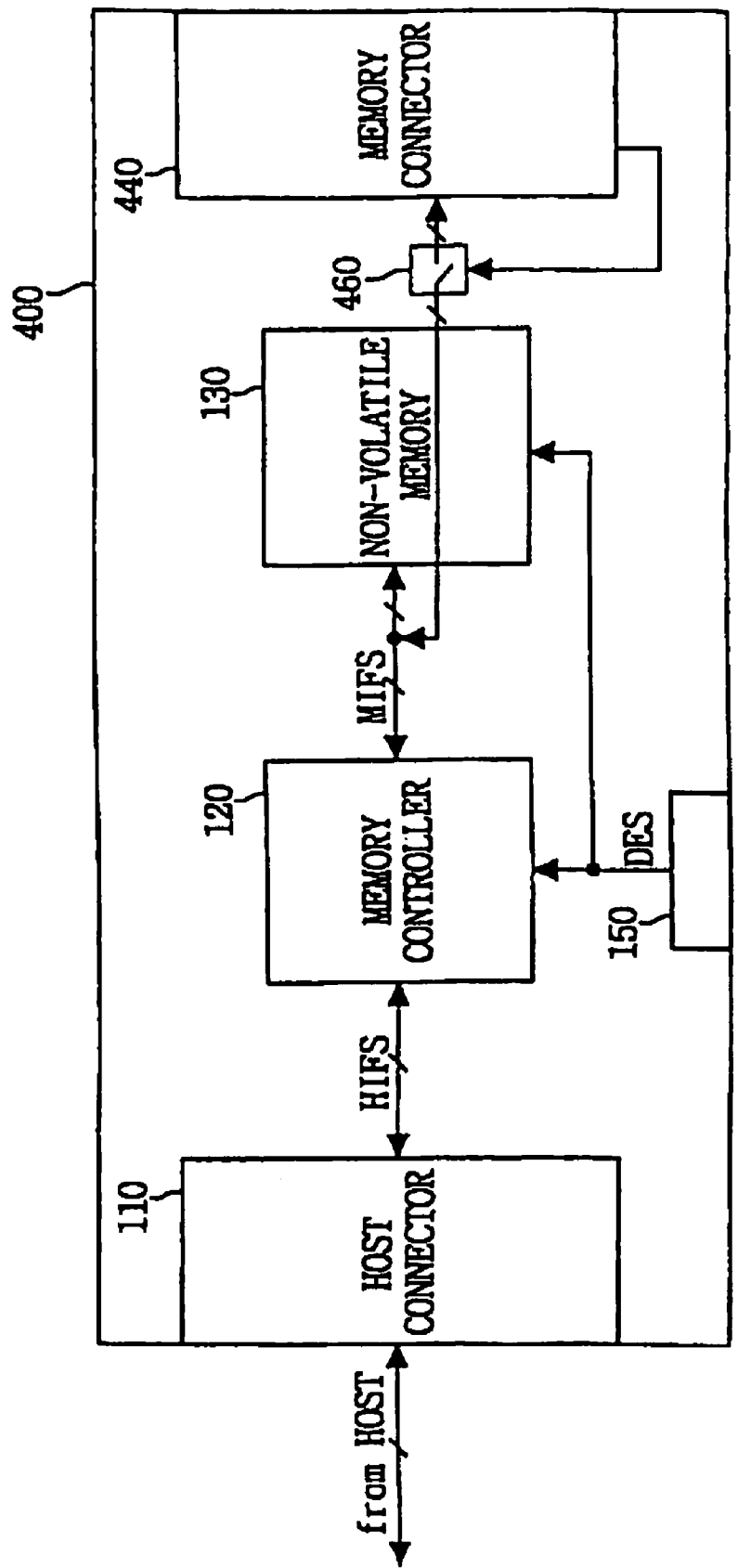
FIG. 4A is another block diagram of a memory card according to example embodiments.
Figure 4B:
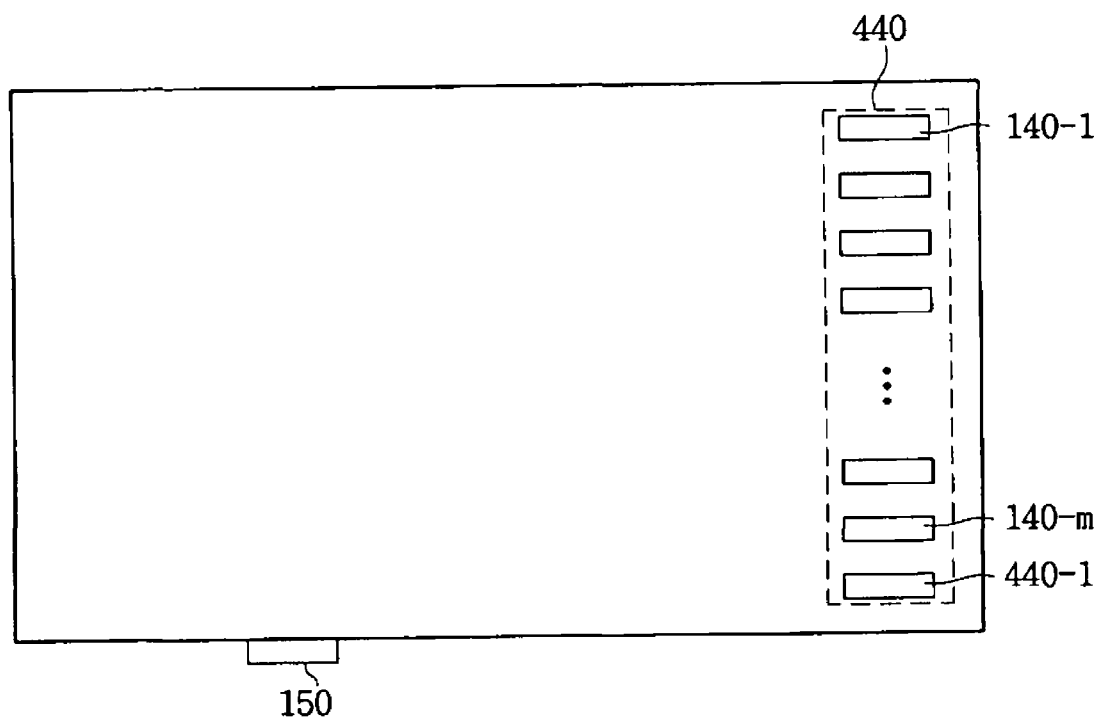
FIG. 4B is a rear view of the memory card of FIG. 4A.

FIG. 4A is another block diagram of a memory card according to example embodiments, and FIG. 4B is a rear view of the memory card of FIG. 4A. The same reference numerals are used below to denote the same components as in the memory card 100 of FIG. 1, and these components may operate in the same way and thus will not be described again.

Referring to FIGS. 4A and 4B, the memory card 400 may include a host connector 110, a memory controller 120, a non-volatile memory 130, a memory connector 440, a capacity expansion switch 150, and a transfer selector 460. Thus, the memory card 400 of FIG. 4A may additionally include the transfer selector 460 in comparison with the memory card 100 of FIG. 1.

Besides the pins 140-1 to 140-m of the memory connector 140 in the memory card of FIG. 2B, the memory connector 440 may additionally include a connection detection means 440-1 for generating a connection detection signal (hereinafter referred to as a CDS signal). The connection detection means 440-1 may sense the contact of pins when two memory cards are connected with each other, and generate the CDS signal. The connection detection means 440-1 may include a connection detection signal generator (not shown) that may sense the contact of at least one of the pins 140-1 to 140-m and generate the CDS signal, or an additional connection pin (not shown) for sensing a connection and a connection detection signal generator (not shown) that may sense the contact of the additional connection pin and generate the CDS signal. According to example embodiments, while the connection detection means 440-1 may be included in the memory connector 440, the connection detection signal generator of the connection detection means 440-1 may be disposed outside of the memory connector 440 in the memory card 400.

The transfer selector 460 may selectively connect the memory controller 120 and the non-volatile memory 130 to the memory connector 440 in response to the CDS signal. For example, when two of the memory cards 400 are connected, the transfer selector 460 may connect the memory controller 120 and the non-volatile memory 130 to the memory connector 440 in response to the CDS signal of a first state, so as to increase storage capacity. On the other hand, when two of the memory cards 400 are not connected, the transfer selector 460 may disconnect the memory controller 120 and the non-volatile memory 130 from the memory connector 440 in response to the CDS signal of a second state.

Consequently, unlike FIG. 1, an MIFS signal output from the memory controller 120 may not always output to the outside of the memory card 400 through the memory connector 440, but may be output to the outside only when the storage capacity is increased.

Figure 5:
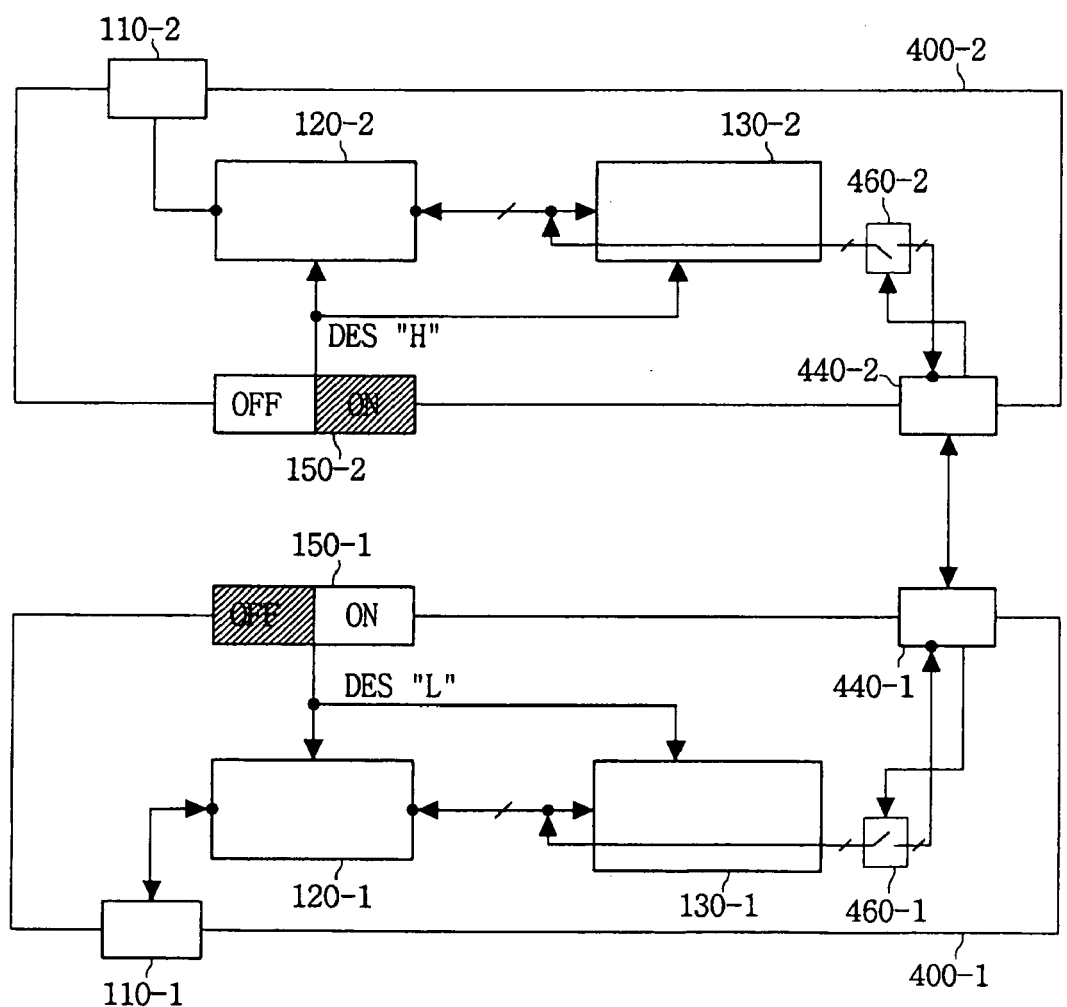
FIG. 5 is a block diagram of a memory storage device having an increased storage capacity by connecting the memory cards of FIG. 4A, according to example embodiments.

FIG. 5 is a block diagram of a memory storage device having an increased storage capacity by connecting the memory cards of FIG. 4A, according to example embodiments. The same reference numerals will be used below to denote the same components as in FIG. 3. Operations that are the same as described above will not be described again, and the focus of the description below will be on the differences between the example embodiments of FIGS. 3 and 5.

Like in FIG. 3, a capacity expansion switch 150-1 of a first memory card 400-1 may be in the off-state, and a capacity expansion switch 150-2 of a second memory card 400-2 may be in the on-state. Thus, a memory controller 120-1 of the first memory card 400-1 may be enabled, and an ID register of a non-volatile memory 130-1 may maintain an initial value. In addition, a memory controller 120-2 of the second memory card 400-2 may be disabled, and a value stored in an ID register of a non-volatile memory 130-2 may be changed.

When memory connectors 440-1 and 440-2 are connected with each other, CDS signals of the respective memory cards 400-1 and 400-2 may become logic high "H", the first state. In response to the CDS signal, the transfer selectors 460-1 and 460-2 may connect memory controllers 120-1 and 120-2 and the non-volatile memories 130-1 and 130-2 in the memory cards 100-1 and 100-2 to the memory connectors 440-1 and 440-2, respectively. For example, only when the two memory cards 400-1 and 400-2 are connected, may the memory connectors 440-1 and 440-2 may be selectively connected with the memory controller 120-1 and 120-2 and the non-volatile memory 130-1 and 130-2 and may an MIFS signal be outputted outside of the memory cards 400-1 and 400-2. In FIG. 5, while the memory connectors 440-1 and 440-2 of the two memory cards 400-1 and 400-2 may be shown directly connected, the memory connector 440-1 of the first memory card 400-1 may be indirectly connected to the memory connector 440-2 of the second memory card 400-2 through an additional connector or a connector of a host.

Operation and effects of the memory storage device having an increased storage capacity may be increased by connecting the two memory cards 400-1 and 400-2 in a manner similar to those of the memory storage device of FIG. 3, and thus the detailed description thereof will be omitted.

In a memory card and a memory storage device using the same according to example embodiments, two of the memory cards may be connected to increase storage capacity. Further, a memory controller of only one of the memory cards may operate to reduce power consumption.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. A memory card, comprising:
a host connector;
a memory controller connected to the host connector and enabled or disabled in response to a capacity expansion signal;
a non-volatile memory connected to the memory controller;
a memory connector configured to connect to the memory controller and the non-volatile memory; and
a capacity expansion switch configured to generate the capacity expansion signal, wherein
the capacity expansion switch is configured to control the capacity expansion signal to be in at least two states,
the non-volatile memory includes an internal Identification (ID) register having an initial value, and the value of the ID register is changed according to the state of the capacity expansion signal,
the non-volatile memory maintains the initial value of the ID register in response to one of the at least two states of the capacity expansion signal, and changes the value of the ID register in response to the other of the at least two states of the capacity expansion signal, and
the host connector is configured to transfer a host interface signal, the memory connector is configured to transfer a memory interface signal, and the host and memory interface signals include ID information that is compared with the value of the ID register.

2. The memory card of claim 1, wherein the memory controller is enabled in response to one of the at least two states.

3. The memory card of claim 1, wherein the host connector and the memory connector are externally exposed outside of the memory card, and the memory connector externally outputs a memory interface signal out of the memory card.

4. The memory card of claim 1, wherein,
the memory controller receives the host interface signal transferred through the host connector and generates the memory interface signal when the memory controller is enabled, and
the non-volatile memory receives the memory interface signal transferred from one of the memory controller and the memory connector, with the non-volatile memory performing an operation when the value of the ID register is the same as the ID information and not performing the operation when the value of the ID register is not the same as the ID information.

5. A memory storage device, comprising:
first and second memory cards, each of the first and second memory cards including the memory card of claim 1, wherein
the memory connectors of the first and second memory cards are connected to each other, and
one of the memory controllers of the first and second memory cards is enabled.

6. The memory card of claim 1, further comprising:
a transfer selector configured to connect the memory controller and the non-volatile memory to the memory connector in response to a connection detection signal, wherein
the memory connector includes a connection terminal configured to generate the connection detection signal.

7. The memory card of claim 6, wherein the memory controller is enabled in response to one of the at least two states.

8. The memory card of claim 6, wherein the host connector and the memory connector are externally exposed outside of the memory card, and the memory connector externally outputs a memory interface signal outside of the memory card.

9. The memory card of claim 6, wherein,
the memory controller receives the host interface signal transferred through the host connector and generates the memory interface signal when the memory controller is enabled, and
the non-volatile memory receives the memory interface signal transferred from the memory controller or the transfer selector, with the non-volatile memory performing an operation when the value of the ID register is the same as the ID information and not performing the operation when the value of the ID register is not the same as the ID information.

10. A memory storage device, comprising:
first and second memory cards, each of the first and second memory cards including a host connector, a memory controller connected to the host connector and configured to be enabled or disabled in response to a capacity expansion signal, a non-volatile memory connected to the memory controller, a memory connector configured to connect to the memory controller and the non-volatile memory, and a capacity expansion switch configured to generate the capacity expansion signal, wherein
the memory connectors of the first and second memory cards are connected to each other,
one of the memory controllers of the first and second memory cards is enabled,
the non-volatile memories of the first and second memory cards each include an internal Identification (ID) register having an initial value, maintain the initial value in response to a first state of the capacity expansion signal, and change the value of the ID register in response to a second state of the capacity expansion signal,
the memory controller of the first memory card is enabled in response to the first state of the capacity expansion signal, receives a host interface signal transferred through the host connector, generates a memory interface signal, and transfers the memory interface signal to the non-volatile memory and the memory connector of the first memory card, the memory controller of the second memory card is disabled in response to the second state of the capacity expansion signal, the second memory card receives the memory interface signal through the memory connector of the second memory card, and the host interface signal and the memory interface signal include ID information that is compared with the value of the ID register.

11. The memory storage device of claim 10, wherein each of the non-volatile memories of the first and second memory cards perform an operation when the value of the respective ID register is the same as the ID information, and do not perform the operation when the value of the respective ID register is not the same as the ID information.

12. The memory storage device of claim 10, wherein the first and second memory cards each include a transfer selector configured to connect their respective memory controller and their respective non-volatile memory to their respective memory connector in response to a connection detection signal, wherein the memory connectors include a connection terminal configured to generate the connection detection signal.

13. The memory storage device of claim 12, wherein each of the non-volatile memories of the first and second memory cards perform an operation when the value of the respective ID register is the same as the ID information, and do not perform the operation when the value of the respective ID register is not the same as the ID information.

* * * * *